(12) United States Patent
Kamihara et al.

(10) Patent No.: US 12,715,179 B2
(45) Date of Patent: Aug. 25, 2026

(54) COMPOSITE MATERIAL FORMING DEVICE AND COMPOSITE MATERIAL FORMING METHOD

(71) Applicants: MITSUBISHI HEAVY INDUSTRIES, LTD., Tokyo (JP); Akita University, Akita (JP)

(72) Inventors: Nobuyuki Kamihara, Tokyo (JP); Sota Kamo, Tokyo (JP); Kiyoka Takagi, Tokyo (JP); Naomoto Ishikawa, Tokyo (JP); Mikio Muraoka, Akita (JP); Yukihiro Yoshida, Akita (JP)

(73) Assignees: MITSUBISHI HEAVY INDUSTRIES, LTD., Tokyo (JP); AKITA UNIVERSITY, Akita (JP)

( * ) Notice: Subject to any disclaimer, the term of this patent is extended or adjusted under 35 U.S.C. 154(b) by 840 days.

(21) Appl. No.: 18/025,257

(22) PCT Filed: Sep. 10, 2021

(86) PCT No.: PCT/JP2021/033329
§ 371 (c)(1),
(2) Date: Mar. 8, 2023

(87) PCT Pub. No.: WO2022/054909
PCT Pub. Date: Mar. 17, 2022

(65) Prior Publication Data

US 2023/0321927 A1 Oct. 12, 2023

(30) Foreign Application Priority Data

Sep. 11, 2020 (JP) ................................ 2020-152996

(51) Int. Cl.
*B29C 70/20* (2006.01)
*H05B 6/14* (2006.01)
(Continued)

(52) U.S. Cl.
CPC ............ *B29C 70/205* (2013.01); *H05B 6/14* (2013.01); *H05B 6/36* (2013.01);
(Continued)

(58) Field of Classification Search
CPC ........... B29C 2791/002; B29C 70/205; B29K 2105/08; B29K 2995/0005;
(Continued)

(56) References Cited

FOREIGN PATENT DOCUMENTS

JP 7531806 B2 * 8/2024 .............. H05B 6/36
WO 2017/170480 10/2017

* cited by examiner

*Primary Examiner* — Quang T Van
(74) *Attorney, Agent, or Firm* — Wenderoth, Lind & Ponack, L.L.P.

(57) ABSTRACT

A composite material forming device forms a composite material including a resin and reinforced fibers having electrical conductivity. The composite material forming device includes: a conduction jig having electrical conductivity, the conduction jig being to be placed on a surface of the composite material so as to make a bridge between both end portions of the reinforced fibers in a fiber direction; and an electric current generating unit that generates an electric current in the conduction jig. The conduction jig placed on the surface of the composite material and the reinforced fibers form a closed loop through which the electric current flows so that the closed loop intersects the surface of the composite material.

10 Claims, 5 Drawing Sheets

(51) Int. Cl.
*H05B 6/36* (2006.01)
*B29K 105/08* (2006.01)

(52) U.S. Cl.
CPC .... *B29C 2791/002* (2013.01); *B29K 2105/08* (2013.01); *B29K 2995/0005* (2013.01); *B29K 2995/005* (2013.01)

(58) Field of Classification Search
CPC .... B29K 2995/005; H05B 6/105; H05B 6/14; H05B 6/36; A61K 47/549; C07K 1/13; C07K 14/47; C07K 16/00; C07K 2317/14; C07K 2317/24; C07K 2317/41; C12P 21/005; C12Y 302/01096; G01N 33/5005; G01N 33/5008; G01N 33/531; G01N 33/532; G01N 33/533; G01N 33/534; G01N 33/581; G01N 33/582; G01N 33/583; H01M 2008/1293; H01M 8/0202; H01M 8/0206; H01M 8/0232; H01M 8/0258; H01M 8/0271; H01M 8/1097; H01M 8/12; H01M 8/1226; H01M 8/124; H01M 8/1286; H01M 8/2404; H01M 8/2418; H01M 8/2425; H01M 8/2432; H01M 8/2483; Y02E 60/50; Y10T 436/17
USPC ......................................... 219/635, 649, 650
See application file for complete search history.

COMPOSITE MATERIAL FORMING DEVICE AND COMPOSITE MATERIAL FORMING METHOD

FIELD

The present invention relates to a composite material forming device and a composite material forming method.

BACKGROUND

As a conventional composite material forming device, a high-frequency heating device that heats an object to be heated by applying thereto high-frequency waves has been known (see, for example, Patent Literature 1). In this high-frequency heating device, a carbon fiber composite material is heated as the object to be heated. The carbon fiber composite material has conductive reinforcement dispersed in an insulating resin matrix, and the high-frequency heating device heats the object to be heated by applying high-frequency waves and heating the reinforcement.

CITATION LIST

Patent Literature

Patent Literature 1: WO 2017/170480

SUMMARY

Technical Problem

However, in the case of Patent Literature 1, the conductive reinforcement needs to be dispersed in the insulating resin matrix when high-frequency heating is performed. This makes it difficult to properly heat a composite material that does not contain reinforcement. Here, since carbon fibers contained in the composite material have electrical conductivity, it is conceivable to heat the composite material by inductively heating the carbon fibers. When the composite material is heated by induction heating, a conductive path needs to be formed in the composite material. Thus, a composite material with carbon fibers stacked in multiple fiber directions is used. On the contrary, as a composite material, there is, for example, a unidirectional (UD) material in which the carbon fibers all run in a single fiber direction. When a UD material is used, the carbon fibers all run in a single fiber direction, thereby failing to form a conductive path for induction heating, which makes induction heating difficult.

Therefore, it is an object of the present invention to provide a composite material forming device and a composite material forming method that are capable of properly heating a composite material.

Solution to Problem

A composite material forming device according to the present invention forms a composite material including a resin and reinforced fibers having electrical conductivity. The composite material forming device includes: a conduction jig having electrical conductivity, the conduction jig being to be placed on a surface of the composite material so as to make a bridge between both end portions of the reinforced fibers in a fiber direction; and an electric current generating unit that generates an electric current in the conduction jig. The conduction jig placed on the surface of the composite material and the reinforced fibers form a closed loop through which the electric current flows so that the closed loop intersects the surface of the composite material.

A composite material forming method according to the present invention is for forming the composite material by using the above-described composite material forming device. The composite material forming method includes the steps of: forming the closed loop by placing the conduction jig on the surface of the composite material; and generating an electric current in the conduction jig by the electric current generating unit to heat the reinforced fibers constituting the closed loop.

Advantageous Effects of Invention

According to the present invention, even if the composite material is a UD material, the composite material can be properly heated.

DESCRIPTION OF EMBODIMENTS

Embodiments according to the present invention will be described in detail with reference to the drawings. These embodiments do not limit the invention. In addition, components in the following embodiments include those that are substitutable and easy by a person skilled in the art, or substantially the same. Furthermore, the components described below can be combined as appropriate, and if there is more than one embodiment, the embodiments can also be combined.

First Embodiment

Figure 1:
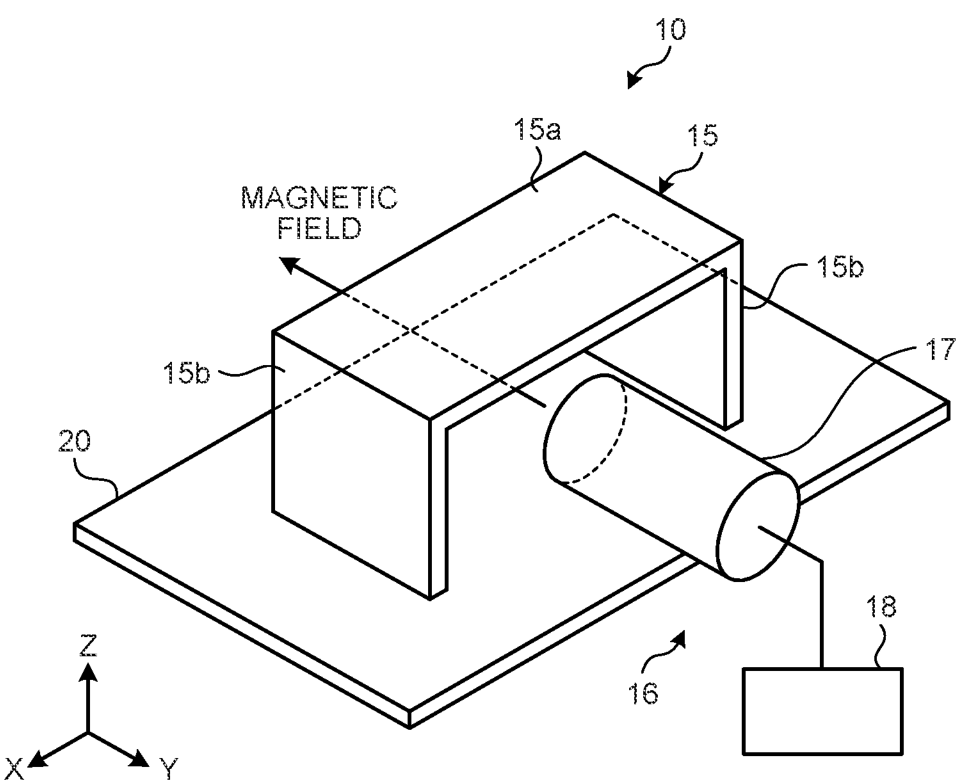
FIG. 1 is a perspective view schematically illustrating a composite material forming device according to a first embodiment.

A composite material forming device 10 according to a first embodiment is a device for forming a composite material 20 by heating and curing resin-impregnated reinforced fibers. The composite material 20 will be described prior to the description of the composite material forming device 10. FIG. 1 is a perspective view schematically illustrating the composite material forming device according to the first embodiment.

The composite material 20 to be heated by the composite material forming device 10 contains resin before curing and reinforced fibers having electrical conductivity, and is, for example, prepreg containing resin and carbon fibers. The composite material 20 is a unidirectional material (also referred to as UD material) in which the carbon fibers all run in a single fiber direction (X direction in FIG. 1), and is made in sheet form. The composite material 20 is laminated while curing one layer at a time, to form a laminate. In FIG. 1, a sheet form that is flat in the XY plane is illustrated as the composite material 20. The composite material 20 is not limited to a sheet form, but may be curved, uneven, or any other shape.

Carbon fibers have been applied as the reinforced fibers as described above, but the reinforced fibers are not particularly limited and may be any reinforced fibers, for example, metallic fibers, as long as they have electrical conductivity. The reinforced fibers are impregnated with the resin. A thermosetting resin, which is cured by heating, is applied as the resin. Examples of thermosetting resins include epoxy resin, polyester resin, and vinyl ester resin. The resin is not limited to a thermosetting resin, but may also be a thermoplastic resin. Examples of thermoplastic resins include polyamide resin, polypropylene resin, acrylonitrile butadiene styrene (ABS) resin, polyetheretherketone (PEEK), polyetherketone ketone (PEKK), and polyphenylene sulfide (PPS). However, resin 14 is not limited to these resins, and other resins may be used.

The composite material forming device 10 will now be described with reference to FIG. 1. The composite material forming device 10 includes a conduction jig 15 and an electric current generating unit 16.

The conduction jig 15 has electrical conductivity and is placed on the surface of the composite material 20 before curing. The conduction jig 15 extends in the fiber direction (X direction) of the reinforced fibers, and is shaped to make a bridge between both end portions of the reinforced fibers in the fiber direction. Specifically, the conduction jig 15 has a flat plate portion 15*a* provided facing the surface of the composite material 20, and a pair of side plate portions 15*b* provided at both end portions of the flat plate portion 15*a* in the X direction. The conduction jig 15 is formed in a concave shape with the flat plate portion 15*a* and the pair of side plate portions 15*b*. The flat plate portion 15*a* has the shape of flat plate in the XY plane, and the X direction is the longitudinal direction. The side plate portions 15*b* each have the shape of flat plate that is planar in the ZY plane from both end portions of the flat plate portion 15*a* in the X direction. The parts where the flat plate portion 15*a* and each side plate portion 15*b* are connected are bends. The bends have, for example, 90°. The conduction jig 15 is made by bending both end portions of a flat metal plate, for example, to form the flat plate portion 15*a* and the pair of side plate portions 15*b*.

The conduction jig 15 is placed with respect to the composite material 20 so that the side plate portions 15*b* are positioned at each end portion of the reinforced fibers in the fiber direction. The conduction jig 15 placed on the surface of the composite material 20 and the reinforced fibers form a closed loop through which an electric current flows in the plane intersecting the surface of the composite material 20. The plane intersecting the surface of the composite material 20 is, for example, in the XZ plane in FIG. 1, and is orthogonal to the surface of composite material 20. In other words, the closed loop is formed by the reinforced fibers between the pair of side plate portions 15*b*, the pair of side plate portions 15*b*, and the flat plate portion 15*a*.

In the first embodiment, the conduction jig 15 has been formed in a concave shape, but may have any shape as long as it makes a bridge between both end portions of the reinforced fibers in the fiber direction. The conduction jig 15 may have, for example, a curved shape such as an arch.

The electric current generating unit 16 is a magnetic field generator. The magnetic field generator applies a magnetic field to the internal space formed by the closed loop, thereby generating an induced current in the conduction jig 15. The electric current generating unit 16 has a magnetic field coil 17 and an electric current applying unit 18 that applies an electric current to the magnetic field coil 17.

The magnetic field coil 17 has a conductor wound around an axis in the Y direction, that is, orthogonal to the fiber direction (X direction) in the surface of the composite material 20 (XY plane). The magnetic field coil 17 applies a magnetic field in the Y direction when an electric current is applied. The magnetic field coil 17 applies a magnetic field to the internal space formed by the closed loop, thereby generating an induced current between the conduction jig 15 and the reinforced fibers that form the closed loop.

Figure 2:
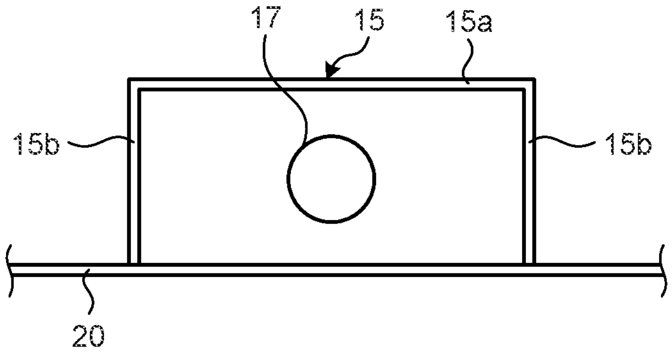
FIG. 2 is a view of the composite material forming device according to the first embodiment, viewed from the direction in which the magnetic field is applied.

As illustrated in FIG. 2, the cross-sectional area of the internal space formed by the closed loop is larger than that of the magnetic field coil 17 in the plane orthogonal to the direction in which the magnetic field is applied. As a result, the magnetic field generated by the magnetic field coil 17 is applied within the internal space of the closed loop without leaking out of the internal space of the closed loop. Furthermore, the magnetic field coil 17 is provided in close proximity to the conduction jig 15 in the Y direction. In other words, the magnetic field coil 17 is not inserted in the internal space formed by the closed loop in the Y direction, but is located outside the internal space.

The electric current applying unit 18 is electrically connected to the magnetic field coil 17 and applies a high-frequency current to the magnetic field coil 17.

In such a composite material forming device 10 as described above, a high-frequency current is applied to the magnetic field coil 17 from the electric current applying unit 18, which induces a high-frequency magnetic field in the magnetic field coil 17, and the high-frequency magnetic field is applied from the magnetic field coil 17 toward the closed loop. When the high-frequency magnetic field is applied to the closed loop, a high-frequency induced current is generated in the closed loop. The generated high-frequency induced current flows through the reinforced fibers, which in turn inductively heats the reinforced fibers and heats the composite material 20. The composite material 20 cures when heated.

A composite material forming method using the composite material forming device 10 will be described next. First, the step of forming a closed loop by placing the conduction jig 15 on the surface of the composite material 20 before curing is performed. At this step, the pair of side plate portions 15*b* of the conduction jig 15 is placed so as to contact (conduct) the reinforced fibers of the composite material 20. If the reinforced fibers are coated with resin, treatment to expose the reinforced fibers may be performed in advance.

After the step of forming a closed loop is performed, the step of heating the reinforced fibers constituting the closed loop by applying a high-frequency current to the conduction jig 15 by the electric current generating unit 16 is performed. By performing this step, the inductively heated reinforced fibers thermoset the resin contained in the composite material 20, to form the composite material 20.

As described above, according to the first embodiment, by placing the conduction jig 15 on the surface of the composite material 20, a closed loop can be formed in the plane intersecting the surface, even when the composite material 20 is a unidirectional material. The composite material 20 can then be suitably heated by applying an electric current to this closed loop.

According to the first embodiment, the electric current generating unit 16 is a magnetic field generator, which can generate a high-frequency induced current in the conduction jig 15.

According to the first embodiment, the electric current generating unit 16 can be made up of the magnetic field coil 17 and the electric current applying unit 18, enabling a simple configuration.

According to the first embodiment, the cross-sectional area of the internal space of the closed loop can be made larger than the cross-sectional area of the magnetic field coil 17 in the direction in which the magnetic field is applied, so that leakage of the magnetic field from the internal space of the closed loop can be prevented and induced current can be suitably generated in the closed loop.

According to the first embodiment, by placing the conduction jig 15 on the surface of the composite material 20, the conduction jig 15 can be easily brought into contact with the reinforced fibers of the composite material 20, which facilitates conduction between the conduction jig 15 and the reinforced fibers.

Second Embodiment

Figure 3:
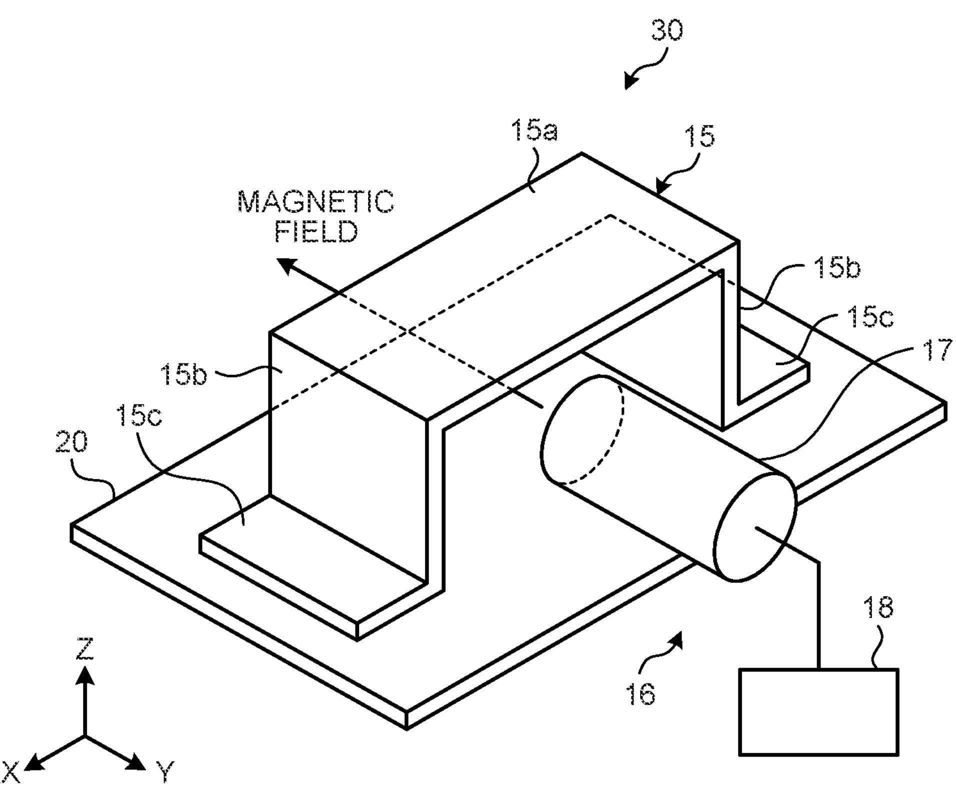
FIG. 3 is a perspective view schematically illustrating a composite material forming device according to a second embodiment.
Figure 4:
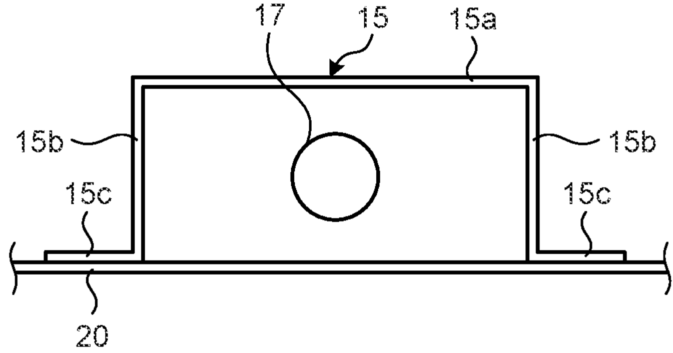
FIG. 4 is a view of the composite material forming device according to the second embodiment, viewed from the direction in which the magnetic field is applied.

A composite material forming device 30 according to a second embodiment will be described next with reference to FIG. 3 and FIG. 4. In the second embodiment, in order to avoid duplicate descriptions, parts that differ from the first embodiment will be described, and parts that have the same configuration as in the first embodiment will be described with the same reference signs. FIG. 3 is a perspective view schematically illustrating the composite material forming device according to the second embodiment. FIG. 4 is a view of the composite material forming device according to the second embodiment, viewed from the direction in which the magnetic field is applied.

The composite material forming device 30 of the second embodiment has a pair of flanges 15*c* provided on the conduction jig 15 of the first embodiment. As illustrated in FIG. 3 and FIG. 4, the flanges 15*c* are each provided at the respective end portions of the side plate portions 15*b* on the composite material 20 side. The flanges 15*c* protrude outward from the respective side plate portions 15*b*. The flanges 15*c* each have the shape of flat plate and are parallel to the flat plate portion 15*a*. In other words, the pair of flanges 15*c* is provided in the XY plane, and is provided so as to face the surface of the composite material 20.

A composite material forming method using the composite material forming device 30 of the second embodiment will be described next. First, the step of forming a closed loop by placing the conduction jig 15 on the surface of the composite material 20 before curing is performed. At this step, the pair of flanges 15*c* of the conduction jig 15 is placed so as to face the surface of the composite material 20. The flanges 15*c* are placed in a noncontact manner with the reinforced fibers. In other words, the resin functions as an insulator, causing the flanges 15*c* and the reinforced fibers to be in a noncontact state, whereby the flanges 15*c* and the reinforced fibers function as both poles of a capacitor. Thus, the conduction jig 15 and the flanges 15*c* are electrostatically coupled to form a closed loop. To facilitate current flow in the closed loop, the area of each flange 15*c* facing the composite material 20 is increased since a larger capacitance is required. If the reinforced fibers are exposed and in contact with the conduction jig 15, the reinforced fibers may be treated in advance to coat them with resin.

After the step of forming a closed loop is performed, the step of heating the reinforced fibers constituting the closed loop by applying a high-frequency current to the conduction jig 15 by the electric current generating unit 16 is performed. By performing this step, the inductively heated reinforced fibers thermoset the resin contained in the composite material 20, to form the composite material 20.

As described above, according to the second embodiment, by placing the conduction jig 15 on the surface of the composite material 20, a closed loop can be formed in the plane intersecting the surface, even when the composite material 20 is a unidirectional material. The composite material 20 can then be suitably heated by applying an electric current to this closed loop.

According to the second embodiment, since the reinforced fibers are impregnated with resin, there is no need to expose the reinforced fibers, and a closed loop can be easily formed by simply placing the conduction jig 15 on the surface of the composite material 20.

Third Embodiment

Figure 5:
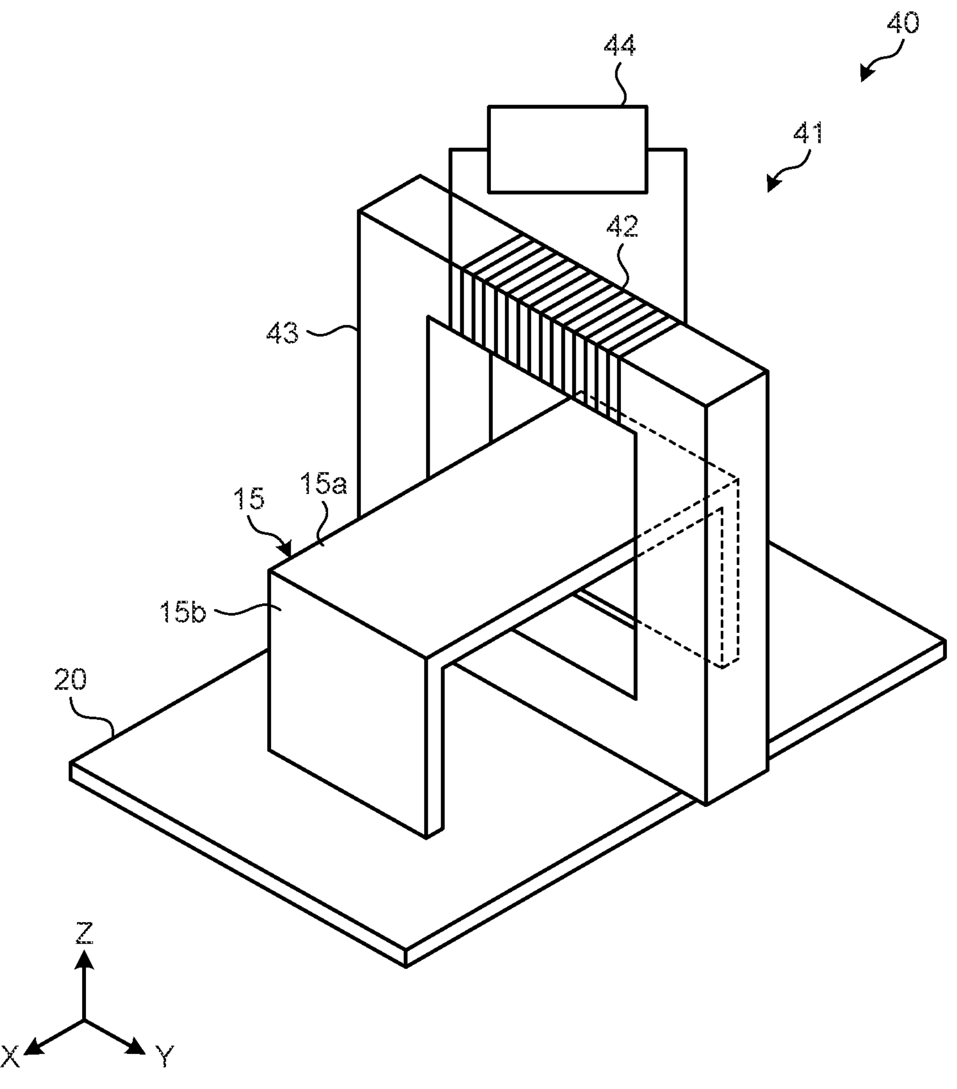
FIG. 5 is a perspective view schematically illustrating a composite material forming device according to a third embodiment.

A composite material forming device 40 according to a third embodiment will be described next with reference to FIG. 5. In the third embodiment also, in order to avoid duplicate descriptions, parts that differ from the first and second embodiments will be described, and parts that have the same configuration as in the first and second embodiments will be described with the same reference signs. FIG. 5 is a perspective view schematically illustrating the composite material forming device according to the third embodiment.

The composite material forming device 40 of the third embodiment has a mutual induction type electric current generating unit 41 instead of the electric current generating unit 16 of the first embodiment. Specifically, the electric current generating unit 41 has a primary coil 42, a magnetic material 43, and an electric current applying unit 44.

The magnetic material 43 is formed in a square frame shape surrounding the flat plate portion 15*a* of the conduction jig 15, and a section on one side is placed within the internal space of the closed loop formed by the conduction jig 15 and the reinforced fibers. The section on the one side placed within the internal space of the closed loop is provided extending in the Y direction. The magnetic material 43 transmits the magnetic field produced by the primary coil 42.

The primary coil 42 is a conductor wound around a section on one side opposite to the section on the other side that is placed in the internal space of the closed loop. The section of the one side where the primary coil 42 is provided is provided extending in the Y direction. The primary coil 42 applies a magnetic field in the Y direction when an electric current is applied. The magnetic field applied by the primary coil 42 is transmitted to the internal space of the closed loop by the magnetic material 43. The magnetic material 43 applies a magnetic field to the internal space formed by the closed loop, thereby generating an induced current between the conduction jig 15 and the reinforced fibers that form the closed loop. In other words, the closed loop functions as a secondary coil.

The electric current applying unit 44 is electrically connected to the primary coil 42 and applies a high-frequency current to the primary coil 42.

In such a composite material forming device 10 as described above, a high-frequency current is applied to the primary coil 42 from the electric current applying unit 44, which induces a high-frequency magnetic field in the primary coil 42, and the high-frequency magnetic field is applied from the primary coil 42 through magnetic material 43 the toward the closed loop. When the high-frequency magnetic field is applied to the closed loop, a high-frequency induced current is generated in the closed loop. The generated high-frequency induced current flows through the reinforced fibers, which in turn inductively heats the reinforced fibers and heats the composite material 20. The composite material 20 cures when heated.

As described above, according to the third embodiment, a high-frequency magnetic field can be applied to the closed loop through the magnetic material 43, so that the magnetic field does not leak and the loss of conversion efficiency to induced current in the closed loop can be reduced. In addition, the device configuration of the electric current generating unit 41 can be simplified because the impedance on the electric current applying unit 44 side can be easily matched with the impedance on the closed loop side.

Fourth Embodiment

Figure 6:
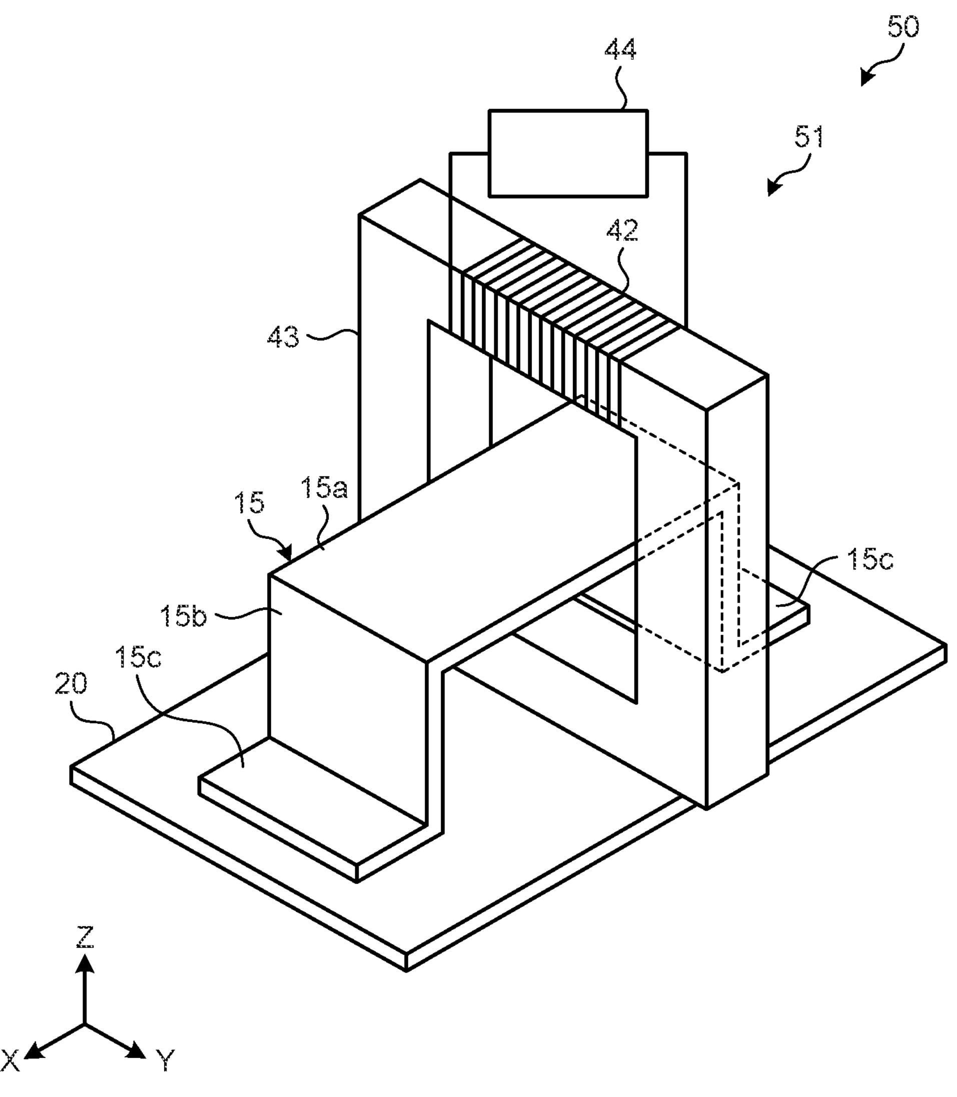
FIG. 6 is a perspective view schematically illustrating a composite material forming device according to a fourth embodiment.

A composite material forming device 50 according to a fourth embodiment will be described next with reference to FIG. 6. In the fourth embodiment, in order to avoid duplicate descriptions, parts that differ from the first to third embodiments will be described, and parts that have the same configuration as in the first to third embodiments will be described with the same reference signs. FIG. 6 is a perspective view schematically illustrating the composite material forming device according to the fourth embodiment.

The composite material forming device 50 of the fourth embodiment has a pair of flanges 15*c* provided on the conduction jig 15 of the third embodiment, as illustrated in FIG. 6. The description of the flanges 15*c* is omitted since the flanges 15*c* have the same configuration as the flanges 15*c* in the second embodiment.

According to the fourth embodiment, as in the second embodiment, by placing the conduction jig 15 on the surface of the composite material 20, a closed loop can be formed in the plane intersecting the surface, even when the composite material 20 is a unidirectional material. The composite material 20 can then be suitably heated by applying an electric current to this closed loop.

According to the fourth embodiment, since the reinforced fibers are impregnated with resin, there is no need to expose the reinforced fibers, and a closed loop can be easily formed by simply placing the conduction jig 15 on the surface of the composite material 20.

Fifth Embodiment

Figure 7:
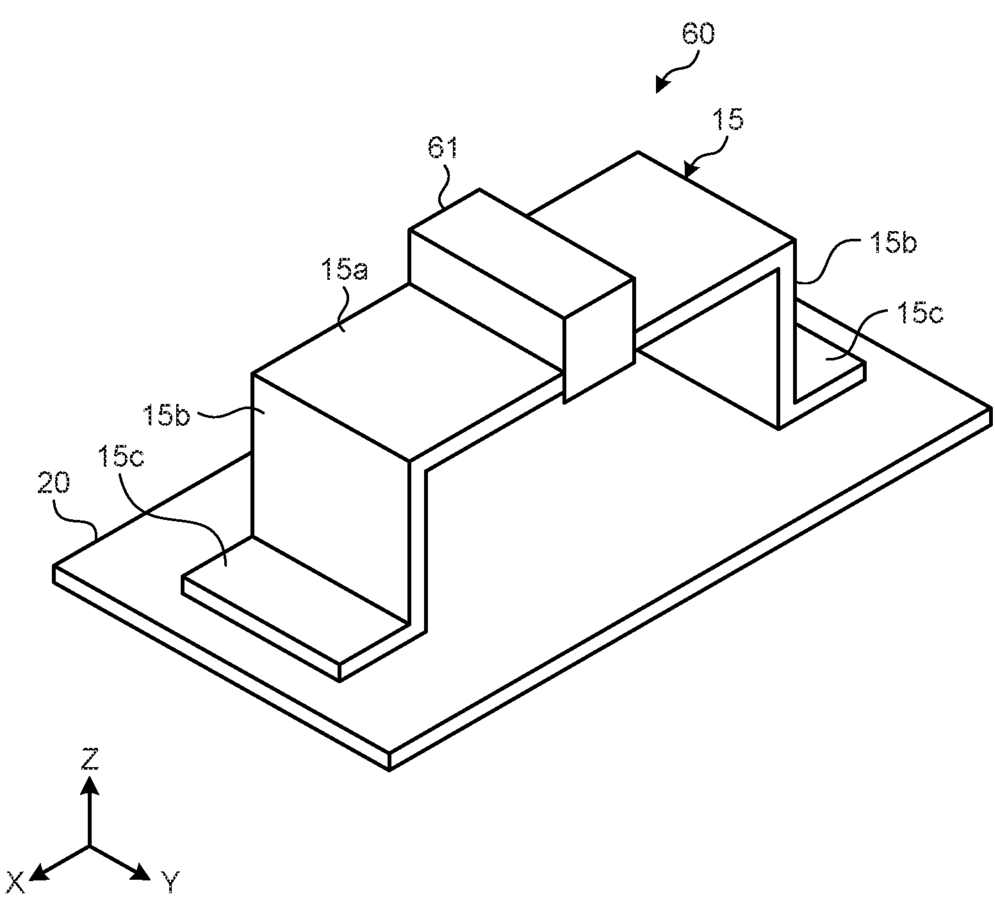
FIG. 7 is a perspective view schematically illustrating a composite material forming device according to a fifth embodiment.

A composite material forming device 60 according to a fifth embodiment will be described next with reference to FIG. 7. In the fifth embodiment, in order to avoid duplicate descriptions, parts that differ from the first to fourth embodiments will be described, and parts that have the same configuration as in the first to fourth embodiments will be described with the same reference signs. FIG. 7 is a perspective view schematically illustrating the composite material forming device according to the fifth embodiment.

In the composite material forming device 60 of the fifth embodiment, an electric current generating unit 61 is an electric current applying device that directly applies an electric current to the conduction jig 15 instead of the electric current generating unit 16 of the second embodiment. In the composite material forming device 60 of the fifth embodiment, the conduction jig 15 with a pair of flanges 15*c* is applied as the conduction jig 15. The electric current generating unit 61 is electrically connected to the conduction jig 15 and applies a high-frequency current to the conduction jig 15. The electric current generating unit 61 is, for example, provided in the center of the flat plate portion 15*a* in the Y direction.

According to the fifth embodiment, since an electric current can be applied directly to the conduction jig 15, the device configuration can be simplified.

REFERENCE SIGNS LIST

10 Composite material forming device
15 Conduction jig
15*a* Flat plate portion
15*b* Side plate portion
15*c* Flange
16 Electric current generating unit
17 Magnetic field coil
18 Electric current applying unit
20 Composite material
30 Composite material forming device (second embodiment)
40 Composite material forming device (third embodiment)
41 Electric current generating unit
42 Primary coil
43 Magnetic material
44 Electric current applying unit
50 Composite material forming device (fourth embodiment)
60 Composite material forming device (fifth embodiment)
61 Electric current generating unit

The invention claimed is:

1. A composite material forming device that forms a composite material including a resin and reinforced fibers having electrical conductivity, the composite material forming device comprising:

a conduction jig having electrical conductivity, the conduction jig being to be placed on a surface of the composite material so as to make a bridge between both end portions of the reinforced fibers in a fiber direction; and an electric current generating unit that generates an electric current in the conduction jig, wherein the conduction jig placed on the surface of the composite material and the reinforced fibers form a closed loop through which the electric current flows so that the closed loop intersects the surface of the composite material.

2. The composite material forming device according to claim 1, wherein the electric current generating unit includes a magnetic field generator, and the magnetic field generator generates an induced current in the conduction jig by applying a magnetic field to an internal space formed by the closed loop.

3. The composite material forming device according to claim 2, wherein the magnetic field generator includes a magnetic field coil and an electric current applying unit that applies an electric current to the magnetic field coil.

4. The composite material forming device according to claim 3, wherein a cross-sectional area of the internal space formed by the closed loop is larger than a cross-sectional area of the magnetic field coil in a plane orthogonal to a direction in which the magnetic field is applied.

5. The composite material forming device according to claim 2, wherein the magnetic field generator includes a primary coil, a magnetic material that magnetically connects the primary coil to the closed loop that functions as a secondary coil, and an electric current applying unit that applies an electric current to the primary coil.

6. The composite material forming device according to claim 1, wherein the electric current generating unit is an electric current applying device that applies an electric current to the conduction jig.

7. The composite material forming device according to claim 1, wherein the conduction jig is in contact with the reinforced fibers when placed on the surface of the composite material.

8. The composite material forming device according to claim 1, wherein;

the conduction jig includes a pair of flanges provided facing both end portions of the reinforced fibers in the fiber direction; and a jig body making a bridge between the flanges, and the flanges and the both end portions of the reinforced fibers in the fiber direction are not in contact with each other through the resin when the conduction jig is placed on the surface of the composite material.

9. The composite material forming device according to claim 1, wherein the composite material is a unidirectional material in which the reinforced fibers all run in a single direction.

10. A composite material forming method of forming the composite material by using the composite material forming device according to claim 1, the composite material forming method comprising:

forming the closed loop by placing the conduction jig on the surface of the composite material; and generating an electric current in the conduction jig by the electric current generating unit to heat the reinforced fibers constituting the closed loop.

* * * * *